United States Patent [19]

Fillman

[11] Patent Number: 4,532,954
[45] Date of Patent: Aug. 6, 1985

[54] WALL HYDRANT

[75] Inventor: Russell E. Fillman, Colorado Springs, Colo.

[73] Assignee: Woodford Manufacturing Company, Colorado Springs, Colo.

[21] Appl. No.: 633,908

[22] Filed: Jul. 24, 1984

[51] Int. Cl.³ .................................... E03B 9/14
[52] U.S. Cl. .................. 137/302; 137/614.13; 138/46; 251/121
[58] Field of Search ............... 137/291, 299, 301, 302, 137/304, 307, 614.12, 614.13; 251/118, 120, 121, 318, 339; 138/46

[56] References Cited

U.S. PATENT DOCUMENTS

| | | | |
|---|---|---|---|
| 230,765 | 8/1880 | Flanagan | 137/307 |
| 654,810 | 7/1900 | Schultz | 251/118 |
| 1,332,797 | 11/1919 | Kottke | 251/118 |
| 3,070,116 | 12/1962 | Noland et al. | 137/302 |
| 4,316,481 | 2/1982 | Fillman | 137/302 |

*Primary Examiner*—George L. Walton
*Attorney, Agent, or Firm*—Zarley, McKee, Thomte, Voorhees & Sease

[57] ABSTRACT

A wall hydrant is described herein comprising a hollow tube having an inlet end and outlet end. The inlet end is adapted to be connected to a source of fluid under pressure and has a valve means adjacent its inlet end. The inlet valve means comprises a cylindrical body portion having an inward end terminating in an arcuate nose portion. A plurality of spaced apart tab elements extend outwardly from the body portion and bear against the inward surface of the hollow tube. A longitudinally extending groove is located on the outer surface of the body portion. A valve seat portion is provided in the inlet end of the tube. A valve control rod is connected to the valve means and extends through the opposite end of the hollow tube to permit remote control of the valve means and to selectively permit the valve means to slide inwardly to a closed position on said tabs, and outwardly to an open position. A drain valve is positioned on the rod and bears on a second valve seat portion when the valve means is open. The drain vavle is unseated and in communication with a drain means when the valve means is closed.

2 Claims, 9 Drawing Figures

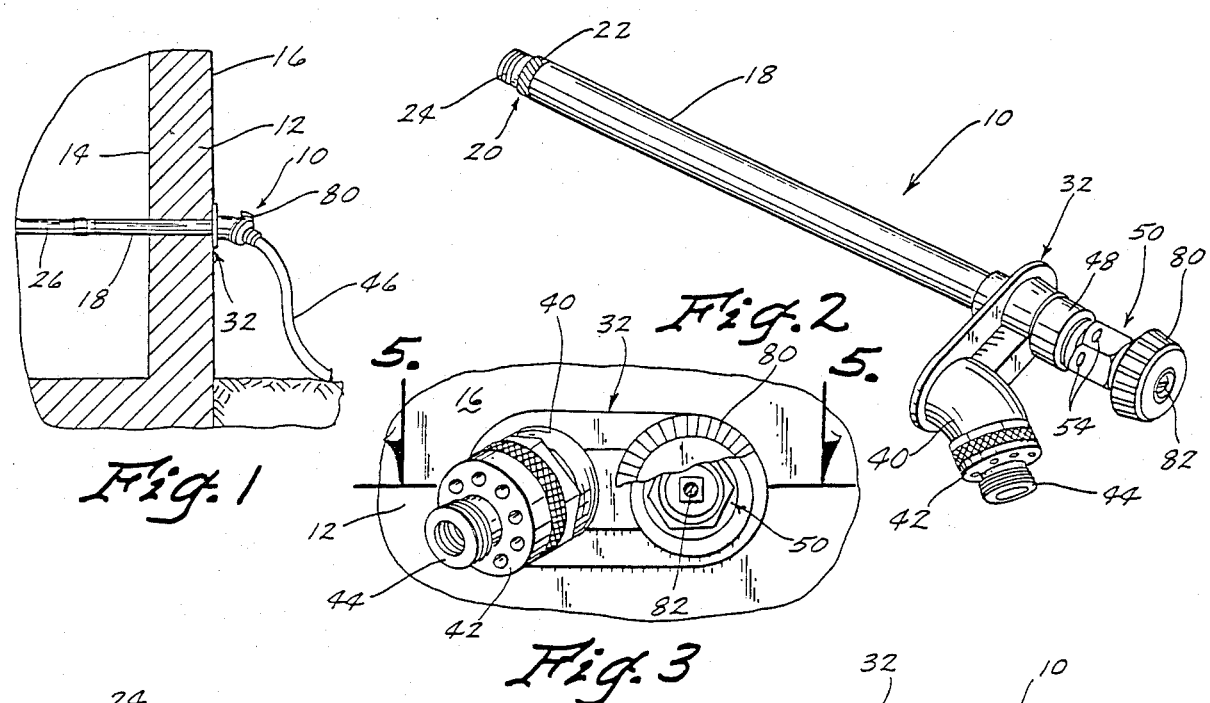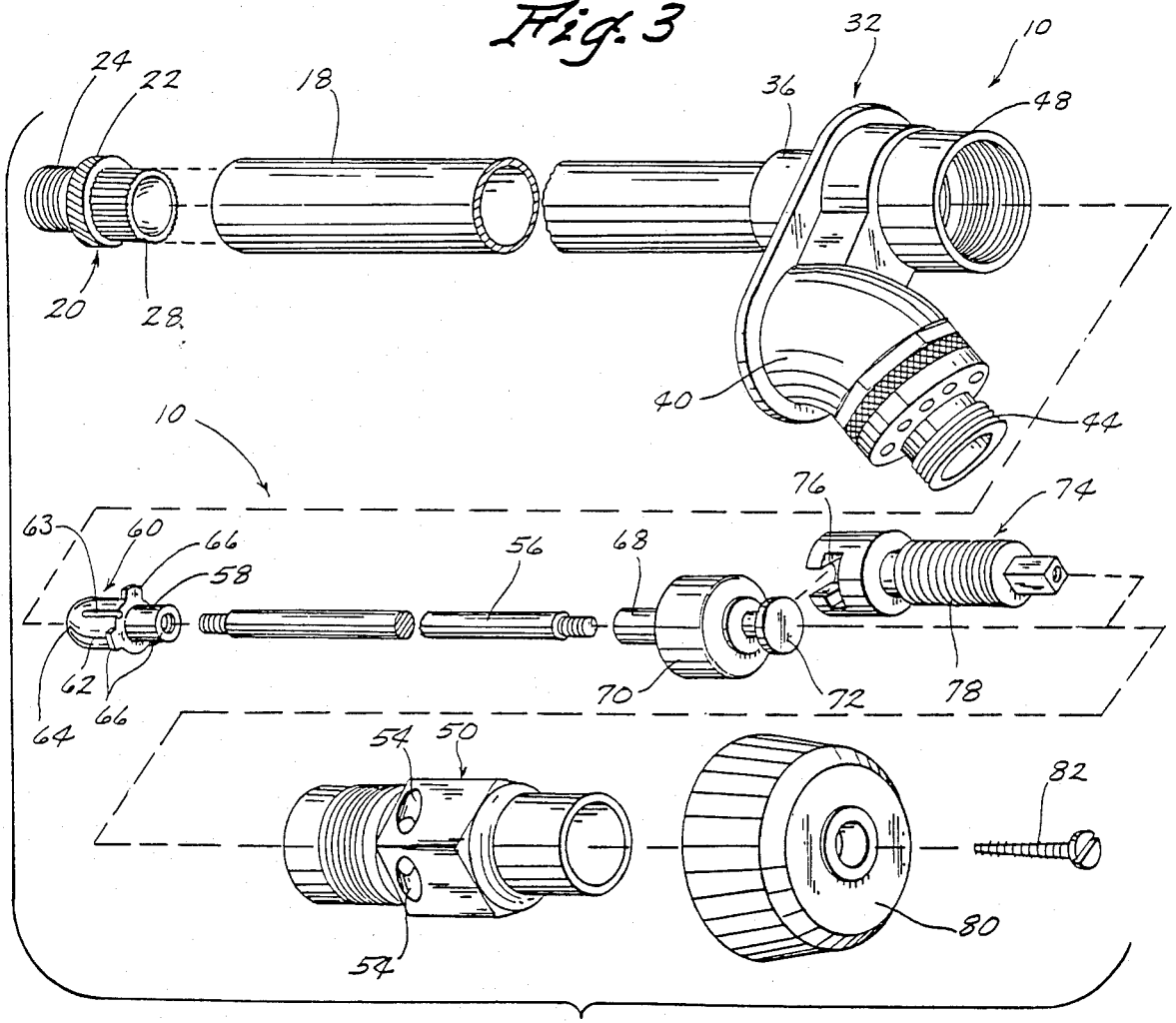

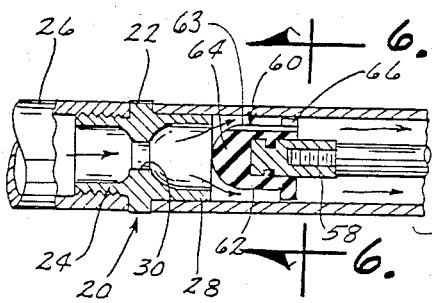
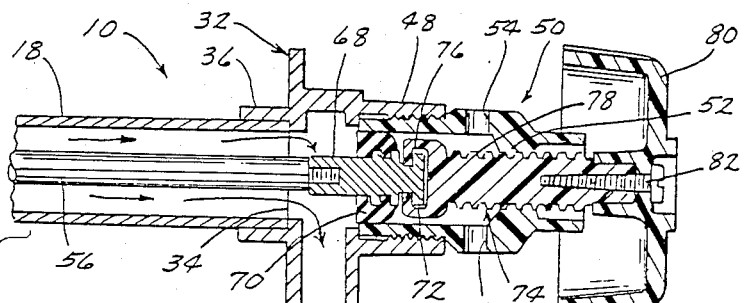
Fig. 5
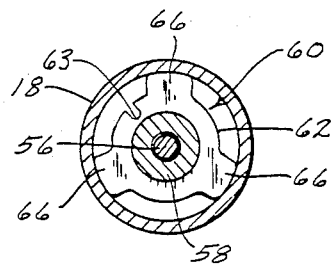
Fig. 6
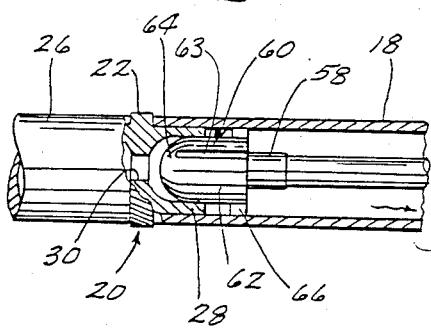
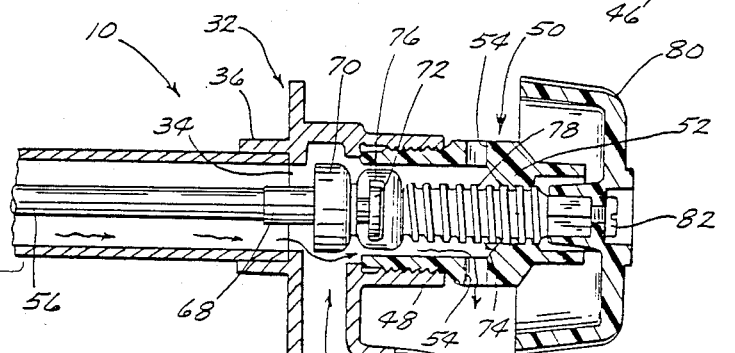
Fig. 7
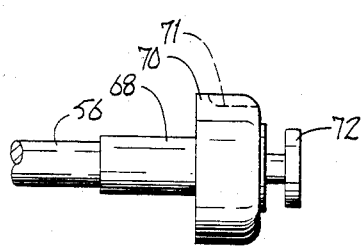
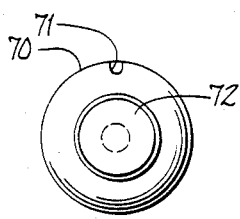
Fig. 8  Fig. 9

WALL HYDRANT

BACKGROUND OF THE INVENTION

Wall hydrants of the prior art commonly have a valve means on the inner end thereof to effect the selective opening and closing of the hydrant to a source of fluid under pressure. The valves in such hydrants are normally expensive to fabricate. Further, these valves often chatter when opened because of the water pressure. The device of U.S. Pat. No. 4,316,481 solved many of these problems. However, the principal involved in the device of that patent was that the drain valve opened as the water valve closed, and visa-versa, providing the desired draining function. However, variations in manufacturing processes sometimes cause either a blind spot where neither drain nor flow occurs, or the opposite where both drain and flow occurs.

In the case of a blind spot, if a user did not turn the faucet off farther, to open the drain, the faucet could freeze and split. In the opposite case, flow could come out the drain at such a rate that the operator would get wet. Also, if the user wanted a very slow flow rate, e.g., to water a shrub, more water might come out the drain causing waste and user dissatisfaction - especially if a vacuum breaker or sprinkler caused back pressure in the outlet of the faucet.

Therefore, the principal object of this invention is to provide an elongated longitudinal groove in either the inlet valve or the drain valve to permit a slow and controlled flow of liquid as these valves are being opened and closed.

A further object of this invention is to provide means on such a hydrant that the user will have a visual signal, i.e., a controlled flow of fluid from the drain valve, which will suggest to the user that the control handle be further rotated to completely shut off the flow of fluid.

A still further object of the invention is to provide a hydrant that will permit the user to obtain a very slow flow of fluid without getting a flow of fluid from the hydrant drain.

These and other objectives will be appartent to those skilled in the art.

BRIEF SUMMARY OF THE INVENTION

A hydrant is described herein which utilizes a tube having an inlet end with an arcuate valve seat therein adapted to be in communication with a source of fluid under pressure. An inlet valve means comprising a cylindrical body portion, an outwardly extending nose portion, and a plurality of spaced apart tabs on the body portion is adapted to align the valves centrally in the tube. The body portion has an elongated longitudinally extending groove on its outer surface to carry a controlled amount of fluid as the valve means is being opened and closed. A drain valve is positioned on the rod and bears on a second valve seat portion when the valve means is open. The drain valve is unseated and in communication with a drain means when the valve means is closed. In an alternate form of the invention a longitudinally extending groove is located in the outer surface of the drain valve instead of the body portion of the inlet valve means. This groove also carries a controlled amount of fluid as the drain valve is being opened and closed. When closed, the arcuate nose portion seats in the valve seat. The valve means is slidably mounted within the tube on the tabs. The opening and closing of the valve means is effected by a longitudinal rod that extends through the tube and is in communication with the outer end of the tube.

BRIEF DESCRIPTION OF THE DRAWINGS

FIG. 1 is a partial sectional view through a wall showing the normal environment of the wall hydrant described herein;

FIG. 2 is an enlarged perspective view of the wall hydrant of this invention;

FIG. 3 is an enlarged front elevation of the hydrant as it is mounted in the wall of FIG. 1;

FIG. 4 is an enlarged scale exploded view of the components of the hydrant of this invention;

FIG. 5 is a partial sectional view taken on line 5—5 of FIG. 3;

FIG. 6 is a sectional view taken on line 6—6 of FIG. 5;

FIG. 7 is a sectional view similar to that of FIG. 5 but with the inlet valve in a position where the only flow is through the control groove in the inlet valve.

FIG. 8 is an elevatonal view of the drain valve of an alternate form of the invention shown at an enlarged scale; and FIG. 9 is an end elevational view of the drain valve as seen from the right-hand side of FIG. 8.

DESCRIPTION OF THE PREFERRED EMBODIMENT

The wall hydrant 10 is normally mounted in wall 12 having an inner side 14 and an outer side 16, as shown in FIG. 1. The hydrant 10 includes a hollow tube 18 which has a valve seat connector 20 secured to its inner end in any convenient fashion. As best shown in FIG. 4, valve seat connector 20 comprises a center flange 22 with a threaded stub 24 which is adapted to be attached to a source of fluid under pressure through pipe 26 (see FIG. 5). The valve seat connector has a valve seat 28 and an inlet aperture 30 which is best shown in FIGS. 5 and 7.

A head casting 32 is provided with an opening 34 with an annular flange 36 which is adapted to receive the outward end of tube 18. (See FIGS. 5 and 7). A laterally extending conduit 38 is provided in casting 32. Conduit 38 is in communication with outlet nozzle 40 to which is secured a vacuum breaker and backflow preventer 42. Element 42 terminates in a threaded portion 44 which is adapted to be connected to a conventional hose 46.

Casting 32 further includes an annular shoulder 48 which is internally threaded and which is co-extensive with tube 18. A hub 50 is threadably received within the annular shoulder 48. Hub 50 includes an inner threaded shoulder 52. A plurality of outlet apertures 54 are located in the hub to permit the hydrant to be selectively drained as will be discussed hereafter.

Elongated valve control rod 56 is located on the center axis of tube 18 and has its inner end threadably secured to stud element 58. A valve element 60 is secured to stud element 58 in any convenient manner. The valve element 60 includes a cylindrical body portion 62 which terminates at its inward end in an arcuate nose portion 64. A plurality of spaced apart tabs 66 extend radially outwardly from the forward end of the cylindrical body portion 62. As shown in FIG. 5, the valve 60 along with body portion 62, nose portion 64, and tabs 66 are cross sectioned showing them to be comprised of a rubber material. An elongated longitudinally extending groove 63 is formed in valve element 60. Groove 63 is adapted to permit a controlled amount of fluid therethrough as the valve element 60 is moved towards an opened or closed position. When valve element 60 is fully seated on valve seat 28, fluid flow through groove 63 is closed.

The outer end of control rod 56 is threadably secured to stud element 68. Valve element 70 is mounted on the stud element 68 in any convenient manner. The valve element 70 is adapted to seal the inner diameter of hub 50 at times as best shown in FIG. 5. In the alternate form of the invention (FIGS. 8 and 9), an elongated longitudinally extending groove 71 is formed in valve element 70. Groove 71 is used in lieu of groove 63 in body portion 62, and is adapted to permit a controlled amount of fluid therethrough as the valve element 70 is moved towards an opened or closed position. When valve element 70 is fully seated within hub 50 (FIG. 5), fluid flow through groove 71 is closed.

The outer end of stud element 68 terminates in a connector head 72 as best shown in FIG. 4. A connector element 74 dwells on the center axis of hub 50 and has a socket 76 which is adapted to receive the connector head 72. The connector element 74 has a threaded portion 78 which is adapted to be threadably received within the threaded shoulder 52 of hub 50. A circular handle 80 is mounted on the outer end of connector element 74 and is affixed thereto by screw 82.

The normal operation of the device of this invention is as follows: The hydrant 10 is normally mounted in a wall structure as shown in FIG. 1. With reference to the embodiment of FIGS. 1-7, the handle 80 is rotated clockwise to move the valve element 60 to a closed position. When this is done, the valve element 70 is in an open position. If any fluid is captured within the hydrant at that time, such as might be the case if a hose 46 or vacuum breaker 42 was affixed to the outlet of the hydrant, the fluid can exit the hydrant as follows: Any entrapped fluid would move from the tube 18 or the conduit 38 past the open valve element 70 and thence into the hub 50 and out the lowermost outlet aperture 54.

When the handle 80 is rotated in an opposite direction, the threaded engagement of the threaded portion 78 of connector element 74 with the threaded shoulder 52 of hub 50 causes the valve elements 60 and 70 to move from the position of FIG. 7 to the position of FIG. 5. Fluid under pressure will thereupon move through inlet aperture 30, past valve 60 and inbetween tabs 66 and outwardly through tube 18. Valve 70 seats within the inner diameter of hub 50 and thereupon diverts the inward flow of water through conduit 38 and outwardly through the outlet nozzle 40.

When the hydrant 10 is fully open, valve 70 closes the drain ports 54, and as the valve 70 is closed, water flow is reduced by valve 60 approaching valve body 28. As this occurs, the flow rate is controlled by the slot 63, and becomes slow and controlled until the valve is fully seated to shut off the unit. During the controlled flow portion of the stroke the drain valve 70 is opened while the flow is very small. Allowing flow out the drain at this time is without any inconvenience to the user, but still warns the user to further rotate the handle and completely shut the faucet off. Also, if a user wishes to get a very slow flow of water, such as to water a newly planted shrub, he can do so with the controlled flow through groove 63 before the drain valve 70 opens without excessive leakage from the drain ports 54.

When the drain valve 70 having groove 71 therein is used, the groove 63 in body portion 62 is eliminated. Groove 71 functions for the drain valve 70 essentially the same as groove 63 functions in regard to body portion 62.

In view of the foregoing, it is seen that this invention will achieve at least its stated objectives.

I claim:

1. A wall hydrant comprising:
a hollow cylindrical tube having an inlet end and an outlet end,
an inlet valve seat connector having an outwardly facing inlet valve seat therein and opposite inner and outer ends,
means for connecting said inner end of said inlet valve seat connector to a source of fluid under pressure,
means for connecting said outer end of said inlet valve seat connector to the inlet end of said hollow tube,
an inlet valve means in said tube adjacent said inlet end, said inlet valve means comprising a cylindrical body portion having inward and outward ends, with the inward end terminating in an arcuate nose portion and said outward end having a cylindrical portion,
an elongated groove located on the outer surface of said cylindrical body portion, said groove commencing in said arcuate nose portion and extending completely to said outward end of said body portion,
said inlet valve seat being complementary in shape to the arcuate nose portion and said cylindrical portion of said inlet valve means,
valve control means extending through said tube and being connected to said inlet valve means to selectively longitudinally slide said inlet valve means inwardly to a closed position on said inlet valve seat, and to selectively slide said inlet valve means outwardly to an intermediate position wherein said body portion is partially seated within said cylindrical seat portion and a limited flow of fluid is permitted only through said groove and thence to an open position wherein said body member is completely unseated from said inlet valve seat whereby fluid may enter the inlet end of said tube and flow outwardly therethrough around said nose portion and said body portion, and
said elongated groove being open for fluid flow until said nose portion of said inlet valve means is completely seated on said nose portion of said inlet valve seat.

2. A wall hydrant, comprising,
a hollow cylindrical tube having an inlet end and an outlet end,
an inlet valve seat connector having an outwardly facing inlet valve seat therein and opposite inner and outer ends,
means for connecting said inner end of said inlet valve seat connector to a source of fluid under pressure,
means for connecting said outer end of said inlet valve seat connector to the inlet end of said hollow tube,
an inlet valve means in said tube adjacent said inlet end, said inlet valve means comprising a cylindrical body portion having inward and outward ends, with the inward end terminating in an arcuate nose portion, said inlet valve seat being complementary in shape to the arcuate nose portion of said inlet valve means, valve control means extending through said tube and being connected to said inlet valve means to selectively longitudinally slide said inlet valve means inwardly to a closed position on said inlet valve seat, and to selectively slide said inlet valve means outwardly to an open position whereby fluid may enter the inlet end of said tube and flow outwardly therethrough around said nose portion and said body portion, a fluid means located in said hollow cylindrical tube adjacent said outlet end, a drain valve means connected to said valve control means adjacent said fluid drain means and adapted to control the flow of fluid from said hollow cylindrical tube to said drain means, a drain valve seat in said hollow cylindrical tube adjacent said drain valve means, said valve control means adapted to close said drain valve means when said inlet valve means is open, and to open said drain valve means when said inlet valve means is closed, and said drain valve means having a longitudinally extending groove on the outer surface thereof and being adapted for only a limited fluid flow immediately prior to the time that said inlet valve means is fully open.

* * * * *